US011233901B2

(12) United States Patent
Massie et al.

(10) Patent No.: US 11,233,901 B2
(45) Date of Patent: Jan. 25, 2022

(54) CALL MANAGEMENT SYSTEM INCLUDING A CALL TRANSCRIPTION SUPERVISORY MONITORING INTERACTIVE DASHBOARD AT A COMMAND CENTER

(71) Applicant: MOTOROLA SOLUTIONS, INC., Chicago, IL (US)

(72) Inventors: Roy Massie, Hoover, AL (US); Ron Wilson, Oceanside, CA (US); Kimberly Siepert, Bulverde, TX (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/092,903

(22) Filed: Nov. 9, 2020

(65) Prior Publication Data

US 2021/0314441 A1  Oct. 7, 2021

Related U.S. Application Data

(62) Division of application No. 16/841,818, filed on Apr. 7, 2020, now Pat. No. 10,868,910.

(51) Int. Cl.
| | |
|---|---|
| *H04M 3/51* | (2006.01) |
| *H04M 3/42* | (2006.01) |
| *G06F 16/63* | (2019.01) |
| *G10L 15/26* | (2006.01) |

(52) U.S. Cl.
CPC .......... *H04M 3/5116* (2013.01); *G06F 16/63* (2019.01); *G10L 15/26* (2013.01); *H04M 3/42042* (2013.01); *H04M 3/5183* (2013.01); *H04M 2201/42* (2013.01); *H04M 2242/04* (2013.01)

(58) Field of Classification Search
CPC combination set(s) only.
See application file for complete search history.

(56) References Cited

U.S. PATENT DOCUMENTS

| | | | |
|---|---|---|---|
| 10,638,298 B1 | 4/2020 | Di Domenico et al. | |
| 2007/0049337 A1* | 3/2007 | Amin | H04M 1/663 |
| | | | 455/556.2 |
| 2014/0169547 A1 | 12/2014 | Murgai | |
| 2019/0068784 A1 | 4/2019 | Reddy | |
| 2020/0068227 A1 | 2/2020 | Han et al. | |

* cited by examiner

*Primary Examiner* — Phung-Hoang J Nguyen
(74) *Attorney, Agent, or Firm* — Daniel R. Bestor

(57) ABSTRACT

A process is described for a call management system to provide a call transcription supervisory monitoring interactive dashboard of incoming calls at a command center. A plurality of incoming calls are received including a first call reflecting a first incident and a second call reflecting a second incident. Audio from the first and second calls are transcribed. First and second incoming call objects are displayed in a call-by-call portion of the interactive dashboard. The transcripts are cross-referenced with a call-by-call keyword database to identify call-by-call keywords of interest, and the incoming call objects are populated with the call-by-call keywords of interest. An all-call object is displayed in an all-call portion of the interactive dashboard. The transcripts are cross-referenced with an all-call keyword database to identify all-call keywords of interest, and the all-call object is populated with the all-call keywords of interest.

20 Claims, 8 Drawing Sheets

*500*

```
        (A)
         ↓
```

512 — CROSS-REFERENCING THE FIRST TEXT TRANSCRIPT WITH A STORED CALL-BY-CALL KEYWORD DATABASE TO IDENTIFY FIRST CALL-BY-CALL KEYWORDS OF INTEREST, AND POPULATING THE FIRST INCOMING CALL OBJECT WITH THE FIRST CALL-BY-CALL KEYWORDS OF INTEREST

514 — CROSS-REFERENCING THE SECOND TEXT TRANSCRIPT WITH THE STORED CALL-BY-CALL KEYWORD DATABASE TO IDENTIFY SECOND CALL-BY-CALL KEYWORDS OF INTEREST, AND POPULATING THE SECOND INCOMING CALL OBJECT WITH THE SECOND CALL-BY-CALL KEYWORDS OF INTEREST

516 — CAUSE AN ALL-CALL OBJECT ASSOCIATED WITH THE PLURALITY OF INCOMING CALLS INCLUDING THE FIRST AND SECOND INCOMING CALLS TO BE DISPLAYED IN AN ALL-CALL PORTION OF THE INTERACTIVE DASHBOARD OF INCOMING CALLS AT THE DISPLAY SCREEN COMMUNICATIVELY COUPLED TO THE ELECTRONIC COMPUTING DEVICE

518 — CROSS-REFERENCING THE FIRST AND SECOND TEXT TRANSCRIPTS WITH A STORED ALL-CALL KEYWORD DATABASE TO IDENTIFY ALL-CALL KEYWORDS OF INTEREST, AND POPULATING THE ALL-CALL OBJECT WITH THE ALL-CALL KEYWORDS OF INTEREST

*FIG. 6*

CALL MANAGEMENT SYSTEM INCLUDING A CALL TRANSCRIPTION SUPERVISORY MONITORING INTERACTIVE DASHBOARD AT A COMMAND CENTER

This application is a divisional of U.S. patent application Ser. No. 16/841,818, filed on Apr. 7, 2020, the entire contents of which is incorporated herein by reference.

BACKGROUND OF THE INVENTION

Civilians, law enforcement, and other public safety and non-public safety personnel may witness or respond to incidents in the course of their daily activities. Call takers and first responders responding to such incidents often benefit from collecting as many pieces of information about the incident (for example, status of incident, status of responding public safety personnel, status of those persons involved in the incident, status of objects/vehicles involved in the incident, status of public or private thoroughfares involved in or adjacent the incident, etc.) as possible from numerous reports via audio and/or video calls. During the occurrence of one or more incidents, the number of audio and/or video calls received at a command center may increase. Emergency call takers and incident-handling dispatchers may not be able to handle and sort through content of the calls efficiently and, as a result, important information may be missed and/or actions by supervisors may be delayed, potentially impacting the health and safety of our communities.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIG. 6 is a flow chart of a second portion of the method for generating and interacting with the call transcription supervisory dashboard for the command center call management system, according to one example embodiment.

Figure 1:
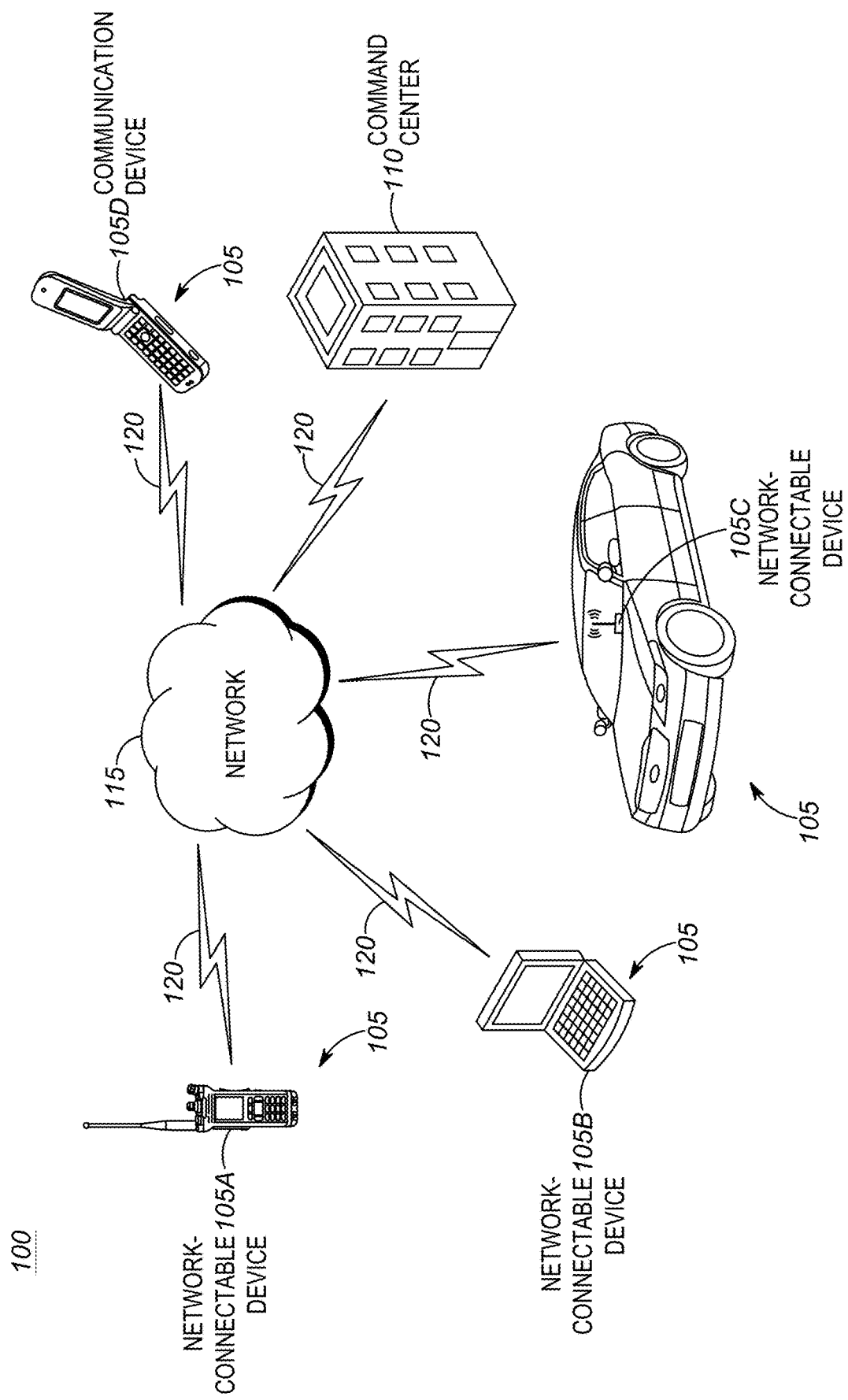
FIG. 1 is a block diagram of a communication system according to one example embodiment.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

One or more devices such as tablets, laptop computers, desktop computers, telephones (for example, cellular, landline, or satellite), devices with an interactive display, and other communication devices may be a part of a console (also referred to herein as a workstation) operated by a call taker or incident handling dispatcher (hereinafter referred to as a call taker). In some embodiments, the workstation of a call taker presents one or more received audio and/or video emergency and/or non-emergency calls to the call taker via an output device. For example, visual content of a video call may be displayed via a computer monitor output portion of the workstation while audio content (alone or as part of the video stream) may be output via a speaker or headphones communicatively coupled to the workstation. In this and other ways, the workstation allows the call taker to participate in audio and/or video calls with civilians, public safety officers, or other public safety or non-public safety personnel at or near an incident, and to receive audio and/or video information regarding the incident, allowing the call taker to become more informed about the incident, record information about the incident, dispatch public safety personnel to the incident, and/or selectively provide portions of such information to en route and/or on-scene public safety personnel responding to the incident.

In some situations, the number of audio and/or video calls routed to a particular command center (sometimes referred to as a public safety answering point (PSAP)) may make it difficult for a supervisor or other monitoring personnel to gain a thorough understanding of the types and number of calls, and/or the relative priority or key subject matter content of those calls, due to an inability to simultaneous monitor a large and growing number of audio and/or video calls. This is especially true for large and/or multiple incidents in which the quantity of audio and/or video emergency calls currently or in the near future may reach into the double (e.g., 10-99) or triple digits (e.g., 100-500). As a result, the supervisor or other personnel may be unable to appreciate the gravity of the workload being handled by call takers in a PSAP or command center, whether that workload is approaching limits of the PSAP or command center or personnel thereof, where resources would be better deployed based on the distribution, content, or types of calls, whether calls are related to a same or similar incident, whether to consolidate calls, to quickly and easily identify trends of incidents so that preemptive action can be taken at the PSAP/command center or in the field, and to identify when and if to enroll the aid of a nearby jurisdiction or over-flow call center, among other possibilities.

This situation may disadvantageously result in some audio and/or video callers hanging-up or otherwise ending the transmitting of audio and/or video content in their call due to delays in reaching a call taker, may cause inappropriate number (too many or too little) of resources to be dispatched to particular large or dispersed incidents, may cause command center resources to be misallocated, may cause a delay in dispatching proper first responders to an incident or incidents, and/or may cause unnecessary stress to be placed upon individual call takers, among other negative effects.

Accordingly, there is a need for a technical system that monitors incoming audio and/or video calls, including emergency and/or non-emergency calls, relating to one or more incidents, and provides an interactive supervisory dashboard of key portions of call transcriptions of those calls in both a digitally organized call-by-call manner and in an all-call manner, so that supervisory decisions reallocating resources (including personnel and incoming calls) within and outside of the command center, and decisions reallocating resources dispatched to incidents, could be more quickly and accurately executed.

In one embodiment, a call management system having a call transcription supervisory monitoring interactive dashboard of incoming calls at a command center includes: an electronic computing device including an electronic processor configured to: receive a plurality of incoming calls including at least a first incoming call having first audio from a first remote device reflecting a first incident and a second incoming call having second audio from a second remote device reflecting a second incident; transcribe the first audio from the first incoming call to create a first text transcript associated with the first incoming call; transcribe the second audio from the second incoming call to create a second text transcript associated with the second incoming call; cause a first incoming call object associated with the first incoming call to be displayed in a call-by-call portion of an interactive dashboard of incoming calls at a display screen communicatively coupled to the electronic computing device, the first incoming call object including at least a first unique identifier uniquely identifying the first incoming call; cause a second incoming call object associated with the second incoming call to be displayed adjacent the first incoming call object in the call-by-call portion of the interactive dashboard of incoming calls at the display screen communicatively coupled to the electronic computing device, the second incoming call object including at least a second unique identifier uniquely identifying the second incoming call; cross-reference the first text transcript with a stored call-by-call keyword database to identify first call-by-call keywords of interest, and populating the first incoming call object with the first call-by-call keywords of interest; cross-reference the second text transcript with the stored call-by-call keyword database to identify second call-by-call keywords of interest, and populating the second incoming call object with the second call-by-call keywords of interest; cause an all-call object associated with the plurality of incoming calls including the first and second incoming calls to be displayed in an all-call portion of the interactive dashboard of incoming calls at the display screen communicatively coupled to the electronic computing device; and cross-reference the first and second text transcripts with a stored all-call keyword database to identify all-call keywords of interest, and populating the all-call object with the all-call keywords of interest.

In a further embodiment, a process for a call management system to provide a call transcription supervisory monitoring interactive dashboard of incoming calls at a command center includes: receiving, at an electronic computing device, a plurality of incoming calls including at least a first incoming call having first audio from a first remote device reflecting a first incident and a second incoming call having second audio from a second remote device reflecting a second incident; transcribing, by the electronic computing device, the first audio from the first incoming call to create a first text transcript associated with the first incoming call; transcribing, by the electronic computing device, the second audio from the second incoming call to create a second text transcript associated with the second incoming call; causing, by the electronic computing device, a first incoming call object associated with the first incoming call to be displayed in a call-by-call portion of an interactive dashboard of incoming calls at a display screen communicatively coupled to the electronic computing device, the first incoming call object including at least a first unique identifier uniquely identifying the first incoming call; causing, by the electronic computing device, a second incoming call object associated with the second incoming call to be displayed adjacent the first incoming call object in the call-by-call portion of the interactive dashboard of incoming calls at the display screen communicatively coupled to the electronic computing device, the second incoming call object including at least a second unique identifier uniquely identifying the second incoming call; cross-referencing, by the electronic computing device, the first text transcript with a stored call-by-call keyword database to identify first call-by-call keywords of interest, and populating the first incoming call object with the first call-by-call keywords of interest; cross-referencing, by the electronic computing device, the second text transcript with the stored call-by-call keyword database to identify second call-by-call keywords of interest, and populating the second incoming call object with the second call-by-call keywords of interest; causing, by the electronic computing device, an all-call object associated with the plurality of incoming calls including the first and second incoming calls to be displayed in an all-call portion of the interactive dashboard of incoming calls at the display screen communicatively coupled to the electronic computing device; and cross-referencing, by the electronic computing device, the first and second text transcripts with a stored all-call keyword database to identify all-call keywords of interest, and populating the all-call object with the all-call keywords of interest.

Each of the above-mentioned embodiments will be discussed in more detail below, starting with example system and device architectures of the system in which the embodiments may be practiced, followed by an illustration of processing blocks for achieving an improved technical method, device, and system for generating and interacting with a call transcription supervisory dashboard for a command center call management system.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

1. Communication System and Device Architecture

FIG. 1 is a block diagram of a communication system 100 according to one example embodiment. The communication system 100 includes various communication devices 105A through 105D communicatively coupled to a command center 110 via a network 115. In the following description, when explaining how a single communication device functions, a reference to communication device 105 is used. As indicated by FIG. 1, the communication device 105 may be any one of a number of different types of communication devices having a transmitting capability (e.g., wireless and/or wired transmission capability) and an audio and/or video recording capability such that recorded audio or audio/video of an incident or captured voice of a user (officer, civilian, etc.) at or near an incident may be transmitted to the command center 110 and may thus be alternatively referred to herein as recording and transmitting devices (RaTDs).

For example, the communication device 105 may be one or more of a smart telephone, a portable radio, a desktop or laptop computer, a tablet, a body wearable camera, or similar device. The communication device 105 may be configured to receive input from a user, for example, via a keyboard, a touchscreen display, a microphone (for example, voice and/or ambient audio), and the like. The types of communication devices 105A through 105D described above and shown in FIG. 1 are merely examples. In other embodiments, the communication system 100 includes other types of communication devices. In some embodiments, the communication system 100 includes more or fewer communication devices 105 than the number of communication devices 105 shown in FIG. 1.

As shown in FIG. 1, the communication system 100 also includes a command center 110. For example, the command center 110 is a security management office at a theme park or a commercial or public safety command center such as a police headquarters, fire station, dispatch center, public safety answering point (PSAP), operations center, command and control facility, and the like. The command center 110 includes a monitoring computer 205 (e.g., on which one or more audio and/or video call monitoring programs (or bots) may be deployed) and one or more workstations 210 (e.g., at one or more call-taker positions manned by respective call takers) that are part of the communication system 100 as will be further explained below with respect to FIG. 2. In the following description, when explaining communication to or from the command center 110, it should be understood that such communication is occurring to or from one or more of the monitoring computer 205 and the workstations 210 included in the command center 110.

As indicated in FIG. 1, the communication devices 105A through 105D and the command center 110 may communicate with each other over a network 115 over respective wireless links 120 and via corresponding network interfaces including, for example, one or more transceiver circuits. The network 115 may include wireless and/or wired portions. All or parts of the network 115 may be implemented using various existing networks, for example, a cellular network including an Long Term Evolution (LTE) network, a 5G network (including a network architecture compliant with, for example, the 3GPP TS 23 specification series and a new radio (NR) air interface compliant with the 3GPP TS 38 specification series) standard, a packet switched network such as the Internet, and Ethernet network, a land mobile radio (LMR) network, a Bluetooth™ network, a wireless local area network (for example, Wi-Fi), a wireless accessory Personal Area Network (PAN), a Machine-to-machine (M2M) autonomous network, and a public switched telephone network. The network 115 may also include future developed networks. In some embodiments, the network 115 may include a combination of two or more of the networks mentioned.

Figure 2:
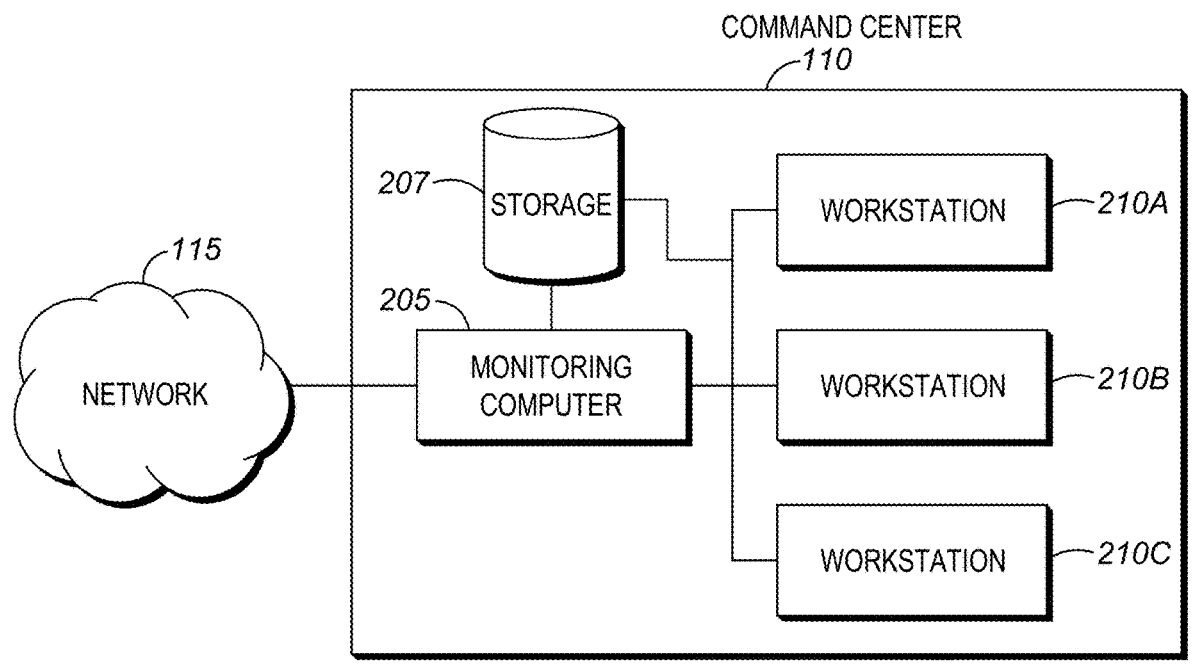
FIG. 2 is a block diagram of a command center included in the communication system of FIG. 1 according to one example embodiment.

FIG. 2 is a block diagram of the command center 110 according to one example embodiment, includes a monitoring computer 205 and a plurality of call handling workstations 210A through 210C, each associated with a different call-taker position. In the following description, when explaining how a single workstation functions, a reference to workstation 210 is used. The workstations 210 may be consoles that are each operated by a separate call taker (for example, public safety dispatch consoles each operated by a separate public safety call taker and/or dispatcher, or other public safety personnel). In some situations, the call takers include both emergency and/or non-emergency call-takers (e.g., personnel that may regularly interface with civilians calling over privately owned phone networks) and incident-handling dispatchers (e.g., personnel that may regularly interface with public safety or enterprise personnel using publicly or privately owned radio networks). In some embodiments, an emergency call-taker is a person who analyzes a received data feed (for example, voice call, live video feed including a video emergency call, text message, and the like), identifies an incident based on the data feed, and decides how to respond to the data feed to help the person (or to help other people or other public safety personnel) handle or respond to the incident. For example, the emergency call-taker may address the situation directly and using only the call, may dispatch first responders to aid the caller or others, may transfer the data feed to a different agency (for example, animal control), may take no action or hand off the data feed to a monitoring bot (for example, when the data feed is a substantially duplicate feed or a lower quality feed or less impactful (based on context of the incident and/or call taker) feed), may transfer the data feed to the workstation of another call-taker (for example, the incident-handling dispatcher or to a language interpretation service or native language call-taker), and the like. A workstation may receive one or more data feeds from multiple sources including, for example, communication devices 105 operated by citizens or first responders/public safety personnel at a same incident and/or location or across different incidents and/or locations.

In some situations, a particular call taker and/or dispatcher may be temporarily assigned to a particular incident to which officers are being dispatched, is being supervised, is already providing on-scene assistance, and the like (for example, a concert, a sporting event, an accident, a fire, a reported burglary event, etc.). In some embodiments, the monitoring computer 205 is communicatively coupled to the network 115 and to the workstations 210A through 210C via wired connections, wireless connections, or a combination thereof.

As explained in greater detail below, the monitoring computer 205 is configured to receive one or more data feeds (for example, audio and/or audio/video emergency calls) from one or more communication devices 105 over the network 115. In some embodiments, the monitoring computer 205 is configured to control which received data feeds are provided to which workstations 210, while in other embodiments, the monitoring computer 205 merely takes a passive role and monitors calls being otherwise routed to workstations 210. In still other embodiments, the monitoring computer 205 may take the form of another workstation 210 and may simply monitor calls on a shared communication line between workstations 210 and communication devices 105 or may receive separately routed copies of the communications content (audio) provided to and from the workstations 210. And in other embodiments, the monitoring computer 205 functions may be implemented at one or more of workstations 210, which may function as both a call-taker position and perform all or a portion of the monitoring computer 205 functions described herein. A call-taker at a workstation 205 may thus also access the monitoring/dashboard functions set forth herein locally.

The monitoring computer 205, described more particularly below with respect to FIG. 3, may be implemented as a stand-alone device (for example, an on-premises server) or distributed across one or more electronic processing devices (for example the workstations 210A through 210C). In some embodiments, the monitoring computer 205 may additionally or alternatively be implemented as a cloud-based server/application (for example, operating on one or more virtual servers) accessible via network 115. The monitoring computer 205 may perform substantially real-time (e.g., as the call occurs, and not as a post-process event after the call ends) text transcription on the calls, appropriately tagging portions of the transcript between audio originating from the workstations 210 (call-takers) and audio communications originating from the communication devices 105 (callers), uniquely identifying the call (by call source identifier, or other uniquely assigned identifier) and uniquely identifying the call-taker assigned to the call (by workstation identifier, such as MAC address, or user ID of the call taker, among other possibilities), and store the text transcription at a storage included within the monitoring computer 205 or at a communicatively coupled storage 207, among other possibilities.

The monitoring computer 205 may also have access to keyword databases stored at the monitoring computer 205 itself, or at the communicatively coupled storage 207, and which may include a single database of keywords for both individual calls/incidents and all active (or recently active) calls, or separate databases of keywords for calls/incidents (a call-by-call keyword database) and all active (and/or recently active) calls (an all-call keyword database) that may be used to tag keywords in the real-time text transcripts as they occur (perhaps including a single keyword tag when a single database is used and separate call-by-call and all-call tags when separate databases are used) and as they are stored, or upon subsequent processing and population of dashboard objects as set forth in more detail below.

The workstation 210 is used by a call taker, and in one example, may be a public safety dispatch console used by an incident-handling dispatcher as explained above. The workstation 210 is configured to send and receive data to and from communication devices 105, perhaps via the monitoring computer 205 as set forth above. As indicated by FIG. 1, the workstation 210 may be configured to directly or indirectly communicate with one or more communication devices 105. The workstation 210 may receive captured images, video, audio such as voice calls, audio/video emergency calls, and other data feeds related to incidents indirectly through the monitoring computer 205 or directly over the communication network 115 (via a path bypassing monitoring computer 205). Although the workstations 210 are described as being located at the command center 110, in some embodiments, one or more of the workstations 210 are located/dispersed outside the command center 110, for example, when one or more of the workstations 210 are located at a different command center and/or are portable devices such as the communication devices 105 described above. In some embodiments, the command center 110 includes more or fewer workstations 210 than the number of workstations 210 shown in FIG. 2. All or a portion of the workstation functions described herein could be executed at a cloud compute cluster or server, and the workstations 210 may be limited to call-taker interface functions, among other possibilities.

In some embodiments, for each call received at the monitoring computer 205 or at the workstations 210, a call record is created. Each call record includes information regarding the call, for example, a telephone number that the call is from, a timestamp of when the call was first received, a caller identification identifying a user of the communication device that originates the call, a location of the communication device that the call is from, a location of a cell tower that was used to transmit the call when the call is a wireless call, and the like. The call records created may be stored at the monitoring computer 205, at the respective workstations 210, at on-premises storage 207, or at some remote storage location such as at a cloud compute cluster or server accessible via network 115. Text transcripts of calls described above may be stored accompanying the call records, with or without the keyword tagging described above.

Additional information included in the call record may be obtained by analyzing the one or more data feeds and/or metadata included in the call or included prior to the call (e.g., in a header transmitted prior to the content of the call), or obtained via the generated transcripts. The analysis may be performed while the call is in a queue at the monitoring computer and/or when the call is being handled by a call taker at a workstation 210, or some time thereafter.

The call record may be further associated with an incident record. The incident record includes information and details regarding a new incident or an existing incident that is being handled by enterprise and/or public safety responders/officers. The information in the incident record may include, for example, an incident type, a location of the incident, a timeline of the incident, the call-takers involved in handling the incident, and the like. The incident record includes a unique incident record identifier. The identifier is a unique label that discerns a particular incident record from other incident records (for example, an incident number that discerns a fire at 987 Lake Shore Drive from a vehicle accident at 123 Second Street). In some embodiments, the call records regarding the incident and the incident record may be integrated into a single record, while in other embodiments, information from one or more call records associated with the incident may be linked to or populated into an associated incident record, among other possibilities. Incident and/or call records may be stored at records store 207 and made accessible to workstations 210. As alluded to earlier, records store 207 may be a separate storage device from workstations 210, may be a cloud storage device access via one or more networks such as network 115, or may be a distributed storage device distributed across workstations 210, among other possibilities. Generated transcripts associated with call records may further be stored in incident records as well (again, with or without the keyword tagging described earlier).

Figure 3:
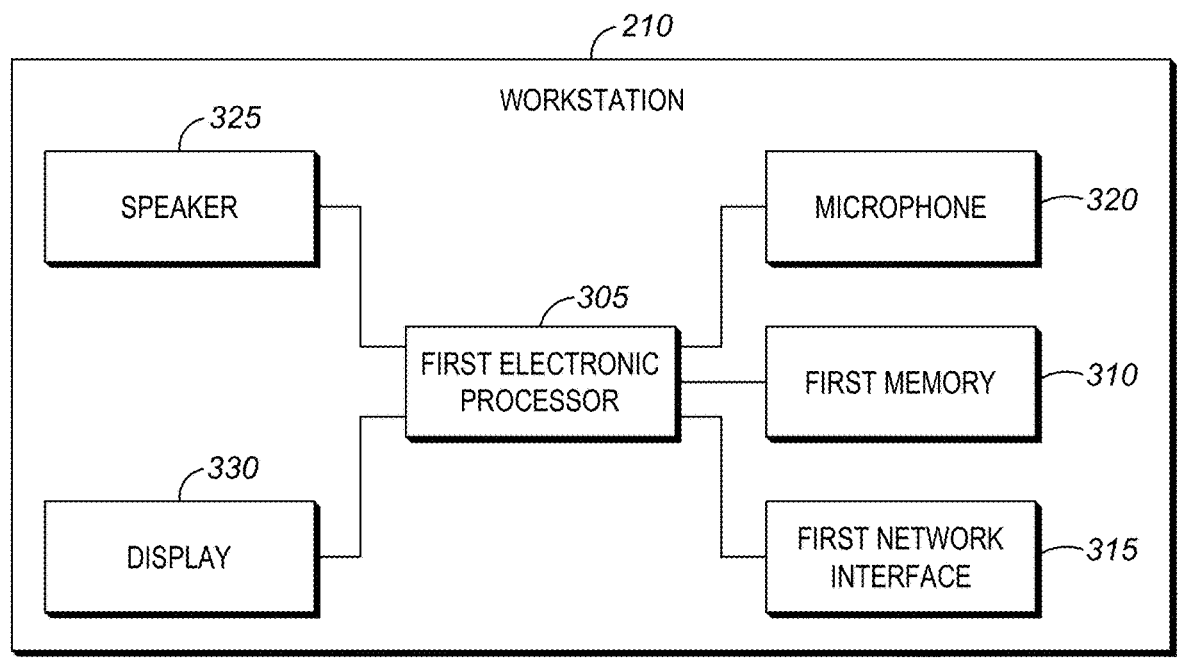
FIG. 3 is a block diagram of a workstation included in the command center of FIG. 2 according to one example embodiment.

FIG. 3 is a block diagram of a workstation 210 according to one example embodiment. In the embodiment illustrated, the workstation 210 includes a first electronic processor 305 (for example, a microprocessor or other electronic device). The first electronic processor 305 includes input and output interfaces (not shown) and is electrically coupled to a first memory 310, a first network interface 315, a microphone 320, a speaker 325, and a display 330. In some embodiments, the workstation 210 includes fewer or additional components in configurations different from that illustrated in FIG. 3. For example, the workstation 210 may additionally include a push-to-talk button and/or a camera, either or both of which may be used to allow the call taker/dispatcher to participate in one of the audio and/or audio/video calls forwarded to the workstation 210. As another example, the workstation 210 may include one or more additional input devices such as a computer mouse and/or a keyboard that receive inputs from a user of the workstation 210. In some embodiments, the workstation 210 performs functionality in addition to or other than the functionality described below.

The first memory 310 may include read only memory (ROM), random access memory (RAM), other non-transitory computer-readable media, or a combination thereof. The first electronic processor 305 is configured to receive instructions and data from the first memory 310 and execute, among other things, the instructions. In particular, the first electronic processor 305 executes instructions stored in the first memory 310 to perform the methods described herein, including but not limited to the workstation and/or monitoring computer operations described with respect to FIGS. 5-6 and its associated text. In some embodiments, the first memory 310 is implemented on devices located at the command center 110, at a remote location, and/or at a remote cloud-computing cluster. The first memory 310 may further store, permanently or temporarily, all or portions of one or more singular keyword databases or separate call-by-call and all-call keyword databases, text transcripts of received audio or audio/video calls, and tagged or filtered versions of the text transcripts cross-referenced with the keyword databases, among other electronically created, modified, and/or stored content.

The first network interface 315 electronically sends and receives data to and from the communication devices 105. In some embodiments, the first network interface 315 additionally or alternatively sends and receives data to and from the network 115 through monitoring computer 205. In some embodiments, the first network interface 315 includes one or more transceivers for wirelessly communicating with the monitoring computer 205 and/or the communication devices 105 via network 115. Alternatively or in addition, the first network interface 315 may include a connector or port for receiving a wired connection to the monitoring computer 205 and/or the network 115, such as an Ethernet cable. The first electronic processor 305 may receive one or more data feeds (for example, an audio or audio/video emergency or non-emergency call, an image feed, a text feed, a sensor input data feed, and the like) over the network 115 through the first network interface 315 (for example, data feeds generated by one or more communication devices 105 and transmitted over the network 115). In some embodiments, the first electronic processor 305 receives data through the first network interface 315 directly from a communication device 105. In some embodiments, communication of data feeds may occur in approximately real-time. The first electronic processor 305 may communicate data generated by the workstation 210 over the network 115 through the first network interface 315, such as for receipt by one or more communication devices 105. For example, the first electronic processor 305 receives electrical signals representing sound from the microphone 320 and may communicate information relating to the electrical signals over the network 115 through the first network interface 315 to other devices, for example, to one or more communication devices 105 for reproduction. Similarly, the first electronic processor 305 may output the one or more data feeds received from the network 115 through the first network interface 315, for example from a communication device 105, through the speaker 325, the display 330, or a combination thereof. For example, the workstation 210 engages in a bidirectional (or unidirectional) audio or audio/video emergency call with a communication device 105 over the network 115.

The display 330 displays images, video, text, and/or data to the user (for example, an incident-handling call taker). The display 330 may be a liquid crystal display (LCD) screen or an organic light emitting display (OLED) display screen. In some embodiments, a touch sensitive input interface may be incorporated into the display 330 as well, allowing the user to interact with content provided on the display 330. In some embodiments, the display 330 includes a projector or future-developed display technologies. In some embodiments, the speaker 325 and the display 330 are referred to as output devices that present data feeds to a user of the workstation 210 (for example, an incident-handling dispatcher). In some embodiments, the microphone 320, a computer mouse, and/or a keyboard or a touch-sensitive display are referred to as input devices that receive input from a user of the workstation 210.

In some embodiments, the communication devices 105 include same or similar components as those shown in FIG. 3 with respect to the workstation 210. In some embodiments, the communication devices 105 include fewer or additional components in configurations different from that illustrated in FIG. 3. For example, a communication device 105 may also include one or more of a push-to-talk button to initiate half or full-duplex voice communication over the network 115 (for example, an audio feed), a camera to capture a video feed and/or an image feed to be transmitted over the network 115, a transceiver to transmit and receive control signals and data feeds including audio or audio/video emergency calls, and a location component (for example, a global positioning system receiver) configured to determine the geographic coordinates of the location of the communication device 105. In some embodiments, the communication devices 105 transmit their respective location coordinates over the network 115 when transmitting data feeds to the command center 110 (for example, location information is stored as metadata associated with a data feed). Similarly, in some embodiments, the communication devices 105 also include a time stamp when transmitting a data feed such that the command center 110 may determine a time of capture of the data feed or a time of transmission of the data feed. In some embodiments, the communication devices 105 transmit a unique identifier of the communication device 105 (and/or recording device characteristics) over the network 115 when transmitting data feeds to the command center 110 (for example, a unique identifier is stored as metadata associated with a data feed and may include a media access layer (MAC) address). In some embodiments, the communication devices 105 transmit a text feed over the network 115 to the command center 110 (for example, a text message from a smart phone, portable radio, or the like that includes alphanumeric and/or numeric data).

Figure 4:
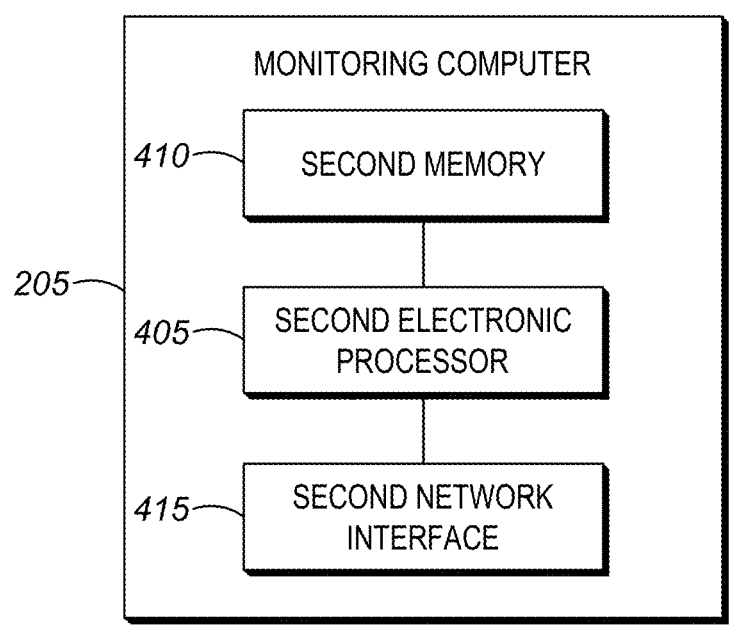
FIG. 4 is a block diagram of a monitoring computer included in the command center of FIG. 2 according to one example embodiment.

FIG. 4 is a block diagram of the monitoring computer 205 according to one example embodiment. In the example shown, the monitoring computer 205 includes a second electronic processor 405 electrically connected to a second memory 410 and a second network interface 415. These components are similar to the like-named components of the workstation 210 explained above with respect to FIG. 3 and function in a same or similar manner as described above. In some embodiments, the second network interface 415 electronically sends and receives data to and from the network 115 and the workstations 210. In some embodiments, the monitoring computer 205 includes fewer or additional components in configurations different from that illustrated in FIG. 4, including in some embodiments, a same or similar architecture and components as the workstation described with respect to FIG. 3. For example, the monitoring computer 205 may additionally include a display such as a touch screen (sometimes referred to as a wall board) to allow a user or users to view and interact with a monitoring dashboard in a large group setting such as a public safety answering point staffed by many user, call takers, and/or supervisors. In some embodiments, the monitoring computer 205 performs functionality other than the functionality described below.

The monitoring computer 205 is configured to monitor calls from communication devices 105 to workstations 210 (either directly via an intervening position in a communication path between communication device 105 and workstations 210, or indirectly by receiving 'copies' of communications from workstations 210 or other intervening network architecture elements) while the calls remain active.

In some embodiments, data feeds are received from communication devices 105 that include, for example, sensors and a camera, that are not operated by a citizen or an officer. For example, data feeds may be received from one or more of a security camera, a traffic camera, an automated teller machine (ATM), an alarm notification system that monitors one or more of a building, a park, a fence, a parking lot, and other geographical locations (for example, a fire alarm, a toxic gas alarm, and the like), and the like.

While FIGS. 3 and 4 show separate block diagrams of the workstation 210 and the monitoring computer 205, as noted above, in some embodiments, the workstations 210 and monitoring computer 205 functions are integrated. In some embodiments, the monitoring computer 205, the workstations 210, and/or a combination thereof are referred to as an electronic computing device that performs the functionality described below. For example, the electronic computing device may be a single electronic processor (for example, the second electronic processor 405 of the monitoring computer 205) or a plurality of electronic processors located in the monitoring computer 205. In other embodiments, the electronic computing device includes multiple electronic processors distributed across different devices. For example, the electronic computing device is implemented on one or more of the first electronic processors 305 of the workstations 210, the second electronic processor 405 of the monitoring computer 205, and one or more electronic processors located in one or more devices located at the command center 110, at a remote location, or at a remote cloud-computing cluster.

2. Process for Generating and Interacting with a Call Transcription Supervisory Dashboard for a Command Center Call Management System As noted earlier, there is a technological problem in that in some situations, the number of audio and/or video calls, including emergency and/or non-emergency, routed to a particular command center may make it difficult or impossible for a supervisor or other personnel to appreciate the gravity of the workload being handled by call takers in a PSAP or command center, whether that workload is approaching limits of the PSAP or command center or personnel thereof, where resources would be better deployed based on the distribution, content, or types of calls, whether calls are related to a same or similar incident, whether to consolidate calls, to quickly and easily identify trends of incidents so that preemptive action can be taken at the command center or in the field, and to identify when and if to enroll the aid of a nearby jurisdiction or over-flow call center, among other possibilities.

This situation may disadvantageously result in some audio and/or video callers hanging-up or otherwise ending the transmitting of audio and/or video content in their call due to delays in reaching a call taker, may cause inappropriate number (too many or too little) of resources to be dispatched to particular large or dispersed incidents, may cause command center resources to be misallocated, may cause a delay in dispatching proper first responders to an incident or incidents, and/or may cause unnecessary stress to be placed upon individual call takers, among other negative effects.

Accordingly, there is a need for a technical system that monitors incoming audio and/or audio/video calls, including emergency and/or non-emergency calls, relating to one or more incidents, and provides a call transcription supervisory dashboard of key portions of call transcriptions of those incoming calls in both an electronically organized call-by-call manner and in an all-call manner, so that supervisory decisions reallocating resources (including personnel and incoming calls) within and outside of the command center, and decisions reallocating resources dispatched to incidents, could be more quickly and accurately executed.

Figure 5:
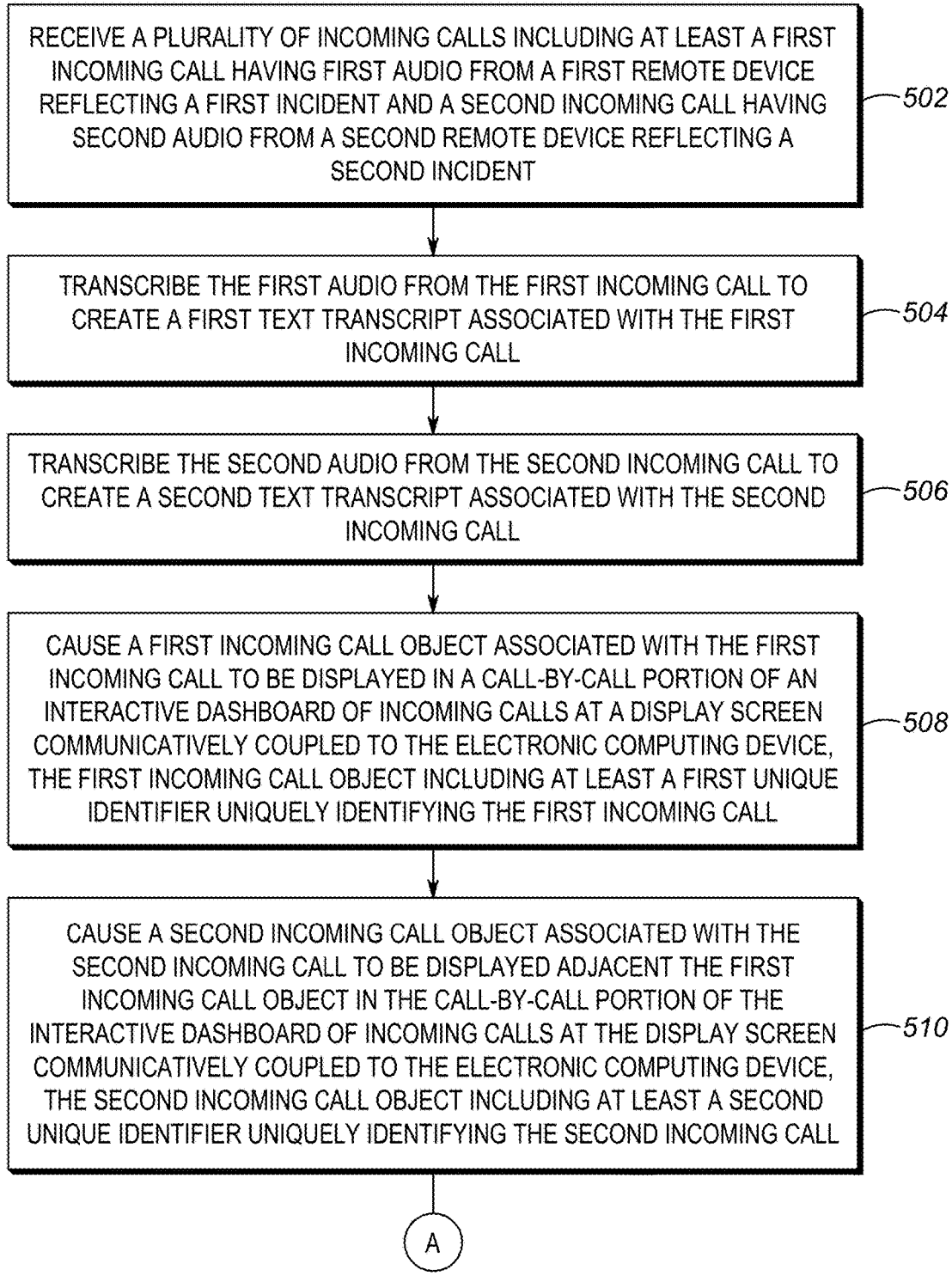
FIG. 5 is a flow chart of a first portion of a method for generating and interacting with a call transcription supervisory dashboard for a command center call management system, according to one example embodiment.

FIGS. 5 and 6 illustrate a flow chart of the process 500 performed by an electronic computing device, such as monitoring computer 205, for a technical system that monitors incoming audio and/or audio/video calls, including emergency and/or non-emergency calls, relating to one or more incidents, and provides a call transcription supervisory dashboard of key portions of call transcriptions of those incoming calls in both an electronically organized call-by-call manner and in an all-call manner.

While a particular order of processing blocks, message receptions, and/or message transmissions is indicated in FIGS. 5 and 6 as an example, timing and ordering of such steps, receptions, and transmissions may vary where appropriate without negating the purpose and advantages of the examples provided.

At block 502 of process 500, the electronic computing device receives a plurality of incoming calls including at least a first incoming call having first audio from a first remote device reflecting a first incident and a second incoming call having second audio from a second remote device reflecting a second incident. For example, a first call (that may be audio-only or include a combined audio/video stream) from a first remote device such as communication device 105D may be received at command center 110 and routed to a workstation 210A at a first call-taking position for answer by a first call taker, and may report information regarding a first incident occurring at a first location.

At the time of receipt of the first incoming call, a call record may be created and populated in a manner as set forth earlier, and an incident record may be created in a manner as set forth earlier reflecting a first incident reported by the first incoming call.

At substantially a same time as the first incoming call is received, or soon thereafter (such as within 10-120s), but in any event, while the first incoming call is still active, a second incoming call (again, that may be audio-only or include a combined audio/video stream) from a second remote device such as communication device 105B may be received at command center 110 and routed to a workstation 210B at a second call-taking position for answer by a second call taker, and may report information regarding a second incident occurring at a second location (which may be a same incident at a same location as the first incoming call, or may be a different incident at a different location from the first incoming call). At the time of receipt of the second incoming call, a second call record may be created and populated in the manner as set forth earlier, and a second incident record may be created (assuming it is a different incident than the first incoming call) in the manner as set forth earlier reflecting a second incident reported by the second incoming call.

At block 504, the electronic computing device transcribes the first audio from the first incoming call to create a first text transcript associated with the first incoming call. As mentioned earlier, the first text transcript is electronically stored, and is created in real-time as voice audio is recognized in the first incoming call and represents a text version of the communications between a caller (for example, a civilian operating communication device 105D) and a call-taker (for example, the call taker operating workstation 210A). The text transcript may be electronically tagged (e.g., via XML markup, or some other electronic document tagging feature) to differentiate between text associated with voiced portions of the incoming call made by the caller and voice portions of the incoming call made by the call-taker. Caller and call-taker may be differentiated in a number of ways, including by separately handling the different voice streams prior to combining into a single digital voice record of the call, or by using voice recognition algorithms to distinguish between a previously enrolled call-taker at the command center 110 and those that are not pre-enrolled and not recognized in a combined audio stream. Other possibilities exist as well. The electronic computing device may use a text transcription engine based on a hidden Markov model algorithm, a neural network algorithm, or some other algorithm to convert electronic audio signals from the first incoming call to electronic text for electronic storage. Other possibilities exist as well.

At block 506, the electronic computing device transcribes the second audio from the second incoming call to create a second text transcript associated with the second incoming call. The second text transcript may be created in a same or similar way as that set forth above with respect to block 504.

At block 508, the electronic computing device causes a first incoming call object associated with the first incoming call to be displayed in a call-by-call portion of an interactive dashboard of incoming calls at a display screen communicatively coupled to the electronic computing device, the first incoming call object including at least a first unique identifier uniquely identifying the first incoming call.

Figure 7:
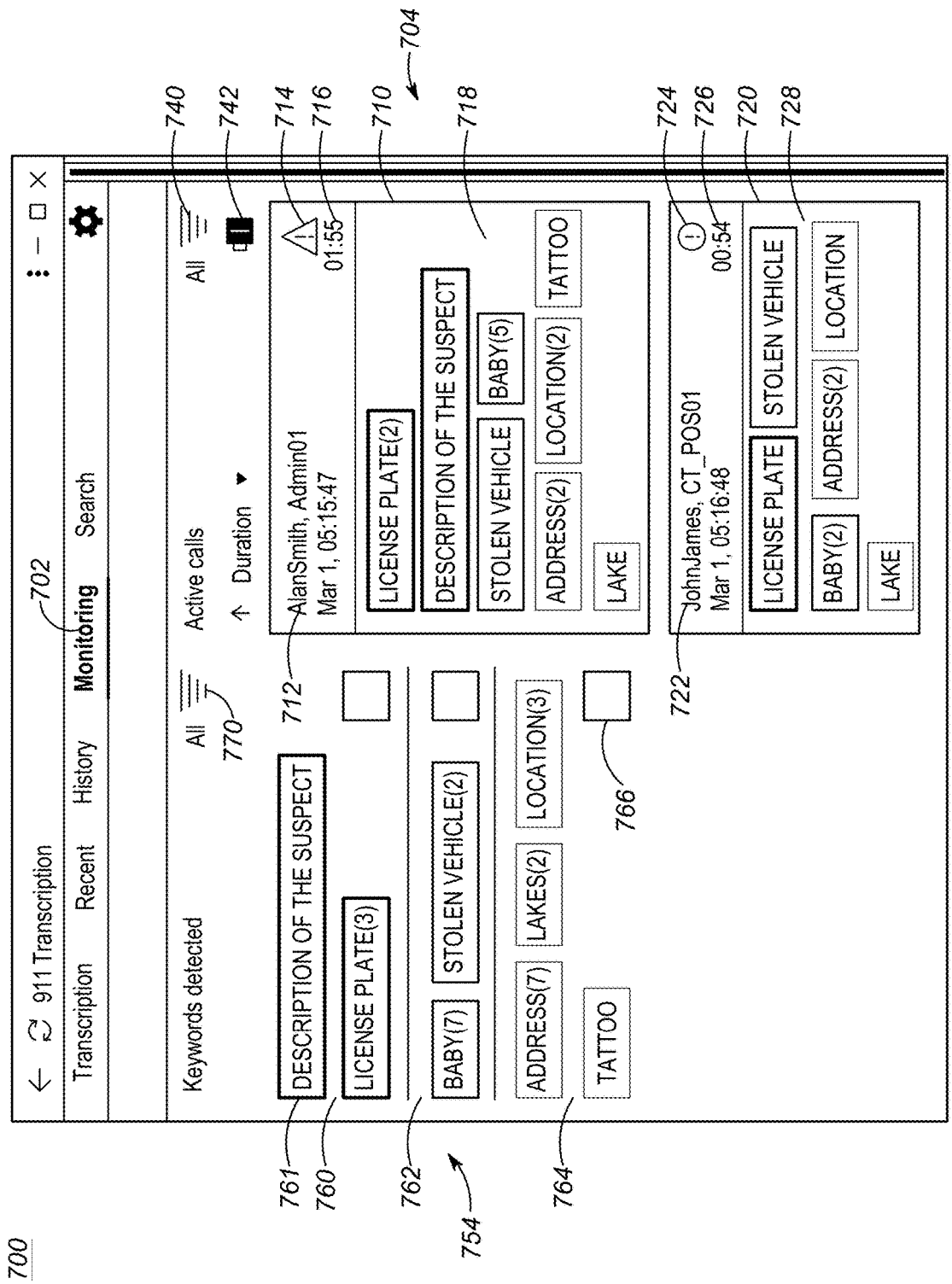
FIG. 7 is a graphical user interface of an example call transcription supervisory dashboard available at one of the monitoring computer of FIG. 4 and the workstation of FIG. 3, according to one example embodiment.

FIG. 7 sets forth an example display screen 700 of an interactive dashboard of incoming calls in accordance with this disclosure. As shown in FIG. 7, a number of menu options at the top of the screen provide access to a number of different functions, including full text transcription, recent call lists, a full history of call lists, a monitoring dashboard 702 consistent with this disclosure, and a search function for searching across previously stored call transcripts. When the monitoring dashboard 702 is selected, a first call-by-call portion 704 of the screen is generated to display call-by-call objects that represent individual active incoming calls and keywords extracted from those respective individual active incoming calls. As shown in FIG. 7, a first incoming call call-by-call object 710 is displayed and may, for example, be associated with the first incoming call from communication device 105D to workstation 210A described earlier. The first incoming call call-by-call object 710 may have a generally rectangular index-card shape as illustrated, or may take some other form or shape. As illustrated, the first incoming call call-by-call object 710 may include a header portion that includes a call identifier 712 identifying a source of the first incoming call (in this case, "Alan Smith", perhaps the owner of communication device 105D) and a destination of the first incoming call (in this case, perhaps a current call taker or position at workstation 210A identified as "Admin01"). In some embodiments, the call identifier 712 may also recite a date and time that the first incoming call was initially received, which in this case is identified as March 1 at 05:15:47. Also included in the header portion may be a call-type indicator 714 that identifies the first incoming call as an emergency (e.g., 911) or non-emergency (e.g., 311) call. In this case, the triangular-shaped icon identifies the first incoming call as a non-emergency type call. Finally, the header portion may also include a duration timer 716 that counts how long the first incoming call has been active. Additional or less information than that illustrated in FIG. 7 may additionally or alternatively be included in the first call-by-call object.

Returning to FIG. 5, at block 510 of process 500, the electronic computing device causes a second incoming call object associated with the second incoming call to be displayed in the call-by-call portion of the interactive dashboard of incoming calls at the display screen communicatively coupled to the electronic computing device, the second incoming call object including at least a second unique identifier uniquely identifying the second incoming call.

As shown in FIG. 7, a second incoming call call-by-call object 720 is displayed in the call-by-call portion 704 of the interactive dashboard and may, for example, be associated with the second incoming call from communication device 105B to workstation 210B described earlier. The second incoming call call-by-call object 720 may generally have the same or similar characteristics to those noted above with respect to call-by-call object 710.

Specifically, and as illustrated, the second incoming call call-by-call object 720 may include a header portion that includes a call identifier 722 identifying a source of the second incoming call (in this case, "John James", perhaps the owner of communication device 105B) and a destination of the second incoming call (in this case, perhaps a current call taker or position at workstation 210B identified as "CT_POS01"). In some embodiments, the call identifier 722 may also recite a date and time that the call was initially received, which in this case is identified as March 1 at 05:16:48. Also included in the header portion may be a call-type indicator 724 that identifies the first incoming call as an emergency (e.g., 911) or non-emergency (e.g., 311) call. In this case, the stop-sign-shaped icon identifies the second incoming call as an emergency type call. Finally, the header may also include a duration counter 726 that counts how long the second incoming call has been active. Additional or less information than that illustrated in FIG. 7 may additionally or alternatively be included in the second call-by-call object, and while FIG. 7 illustrates the second incoming call call-by-call object 720 (emergency call) including same or similar types of information as the first incoming call call-by-call object 710, in other embodiments, they may differ in content.

Furthermore, and while FIG. 7 illustrates first and second incoming call call-by-call objects 710 and 720 arranged in a vertical and adjacent manner, in other embodiments, the incoming call call-by-call objects may be arranged in a partially overlapping manner, or positioned in a diagonally or horizontally adjacent (whether partially overlapping or not) manner. The call-by-call portion 704 of the dashboard, however, is preferably a contiguous portion of the screen. Additional active incoming calls received at the command center could cause additional call-by-call objects to be generated and displayed in the call-by-call portion 704 of the dashboard. The calls may be ordered by call type (emergency first and then non-emergency), by start time, by duration, or by some other keyword-based sorting method as will discussed in more detail below, among other options.

A call type selection filter 740 may allow a user/supervisor to cause only call-by-call objects associated with certain types of calls to be displayed in the call-by-call portion 704. For example, selecting "emergency only" from the call type selection filter 740 may cause only the second call-by-call object 720 to be displayed in the call-by-call portion 704, while selecting "non-emergency only" from the call type selection filter 740 may cause only the first call-by-call object 710 to be displayed in the call-by-call portion 704. As other examples, additional filter selections could also be provided for audio calls only, video call only, sms messages only, incoming calls only, outgoing calls only, body worn camera video streams only, or other possibilities. In the event the number of active calls extends beyond a space available in the call-by-call portion 704, a scroll bar may appear allowing a user to scroll to see the additional call-by-call objects not currently visible in the displayed call-by-call portion 704.

Continuing with process 500 to block 512 of FIG. 6, at block 512, the electronic computing device cross-references the electronically generated first text transcript (e.g., which may not be complete, but which is added to in real-time as additional communications occur within the first incoming call) with a stored call-by-call keyword database to identify first call-by-call keywords of interest, and populates the first incoming call object with the first call-by-call keywords of interest. As noted earlier, the first call-by-call keywords of interest may already be marked up in the stored first transcript as it is being created and block 512 may include merely retrieving them, while in other embodiment, the identification of the call-by-call keywords of interest may occur via a separate process from the creation of the first transcript at, for example, block 512. Other possibilities exist as well.

As shown in FIG. 7, call-by-call keywords of interest 718 for the first incoming call that were stored in the call-by-call keyword database and also appeared in the first incoming call transcript include "license plate" (appearing twice in the call transcript text), "description of the suspect," "stolen vehicle," "baby" (appearing five times in the call transcript text), "address" (appearing twice in the call transcript text), "location" (appearing twice in the call transcript text), "tattoo", and "lake."

While each of the call-by-call keywords are illustrated with one method of visually indicating an associated priority of the call-by-call keywords (perhaps retrieved from the call-by-call keyword database, or cross-referenced to a separate priority database also accessible to or stored at the electronic computing device), in some embodiments, no visual indication of relative priority may be applied to the displayed call-by-call keywords, while in still other embodiments, other ways of displaying relative priority may be used, including but not limited to an ordered list (from highest to lowest priority), divided and visually indicated categories (e.g., high priority: "license plate", "description of the suspect" included in the object 710), variation of a color of the keywords or the borders surrounding the keywords or a background of the keywords (e.g., red text for the highest priority key words, orange for medium priority keywords, and blue for low priority keywords, among other possibilities), variation of a thickness of the keyword text or of the borders as shown (e.g., thickest for highest priority key words, medium thickness for medium priority keywords, and thinnest border for low priority keywords, among other possibilities), a shading applied over or as a background to the keywords, a shape of a border around the keywords, and a size of the keyword font and/or border surrounding the keyword.

In some embodiments, visual aspects of the call-by-call objects may be varied based on a highest-priority call-by-call keyword appearing within it so that a user/supervisor can be quickly and easily distinguish those higher priority calls from lower priority calls. For example, and assuming that the higher priority term "license plate" did not appear in call-by-call object 720 (and its associated full text transcript), the first call-by-call object 710 may have its border varied to match the highest priority terms appearing within it (e.g., a thick bold line similar to "license plate" and "description of suspect" terms) while the second call-by-call object 720 may have its border varied to match the medium priority terms appearing within it (e.g., a medium thick line similar to "stolen vehicle" and "baby"). Of course, other methods of visually indicating the relative priority of the call-by-call objects could be implemented, same or different than that used to indicate the relative priority of the call-by-call keywords included therein, including one or more of the methods set forth herein with respect to the call-by-call keywords, among other possibilities.

Furthermore, and as illustrated in FIG. 7, a number of times that each call-by-call keyword appears in the call transcript of the first incoming call is indicated as well (e.g., "baby(5)") when the call-by-call keyword 'baby' is voiced five times in the call as indicated in the call transcript. That number can be incremented each additional time the word is voiced as the transcript of the call continues to be generated in real-time. In other embodiments, the number of times the keyword appears may not be indicated, but may affect an assigned priority. In other words, the keyword "baby" may have a low priority when voiced once, but a higher priority when voiced more than five times, and the increase in the count may cause the keyword "baby" to be promoted from an indicated low priority keyword to an indicated high priority keyword, among other possibilities. Such priority variations and thresholds may be stored in the call-by-call keyword database, or in the separate priority database, among other possibilities.

Still further, a caller/call-taker selection filter 770 may allow a user/supervisor to cause call objects (including all-call objects and call-by-call objects) to be updated so that only respective keywords voiced by the selected call participant (e.g., caller or call-taker) are displayed in the respective call-by-call portion 704 and all-call portion 754. If no keywords were voiced by the selected caller or call-taker, the call object could appear with an empty list of keywords (in one embodiment) or could disappear from the screen (in another embodiment).

For example, selecting "caller only" from the caller/call-taker selection filter 770 may cause only those keywords in the second call-by-call object 720 to be displayed that were voiced by the caller. So if the keywords "location" and "lake" were indicated in the second incoming call text transcript as being voiced by the call-taker and not by the caller, those keywords would disappear from the call-by-call keywords of interest 728 portion of the second call-by-call object 720. Similar effects would be applied when "call-taker only" were selected, but would limit display to those keywords voiced by the call-taker in the generated text transcript (and if no keywords, the call object could appear with an empty list of keywords, or could be entirely removed from the call-by-call portion 704 of the dashboard).

An available keyword display enable/disable selection filter 742 (in this case, embodied as a sliding switch) may allow a user/supervisor to cause call keywords to be displayed or not displayed in the call-by-call objects. For example, switching the keyword display enable/disable selection filter 742 to a disable state in FIG. 7 would cause all of the displayed call-by-call keywords in call-by-call objects 710 and 720 to be removed from their respective call-by-call keywords of interest 718, 728 portions. As a result, each call-by-call object 710, 720 could be shrunk in size and more call-by-call objects displayed on the dashboard in the call-by-call portion 704 at a same time, in those situations where the user/supervisor may want a better view of all pending/active calls.

As mentioned earlier, the call-by-call keyword database may contain priorities of keywords that may be indicated in the call-by-call objects in one or more of the ways set forth above. Levels of priority may be scored with two or more alphanumeric or numerical values to relatively differentiate them, such as two (high(1) and low(0)), three (high(2), medium(1), or low(0)) or more (e.g., on a scale of 1 to 10 or 1 to 100 where the highest is most important and the lowest is least important, or vice versa). Examples of high priority keywords may include those associated with a relatively immediate potential harm to arriving first responders (e.g., such as "gun" or "gun shots" or "# of assailants" or "bomb" or "hazardous material") or of relatively immediate potential harm (such as life-threatening) to victims or suspects (e.g., such as "seriously wounded" or "heart attack" or "breathing problem") or of substantial time importance (e.g., such as "missing child" or "amber alert" or "silver alert" or "person in the water"), while examples of medium priority keywords may include those associated with assessing a scene or incident (e.g., such as "number of injuries" or "number of vehicles" or "age of the suspect") or those associated with non-life threatening medical status that may still need attention by medical professionals (e.g., such as "radiating pain" or "broken bone" or "shortness of breath") or of a status of type of an incident (e.g., such as "theft" or "suspicious activity" or "stalking"), and while examples of low priority keywords may include those associated with non-life threatening medical status that may not need attention by medical professionals (e.g., such as "back pain" or "aspirin" or "abdominal pain") or general scene contents or status (e.g., such as "church" or "college" or "deer" or "cat") or general public aid actions unrelated to crimes or health emergencies (e.g., such as "locked out" or "lost keys" or "cat in tree" or "noise complaint" or "tow zone"), among other possibilities and other possible breakdowns of priorities.

Returning to FIG. 6, process 500 then continues to block 514, where the electronic computing device cross-references the electronically generated second text transcript (e.g., which may not be complete, but which is added to in real-time as additional communications occur within the incoming call) with the stored call-by-call keyword database to identify second call-by-call keywords of interest, and populates the second incoming call object with the second call-by-call keywords of interest. As shown in FIG. 7, call-by-call keywords of interest 728 for the second incoming call that were stored in the call-by-call keyword database and also appeared in the second incoming call transcript include "license plate" (appearing once in the call transcript text), "stolen vehicle," "baby" (appearing twice in the call transcript text), "address" (appearing twice in the call transcript text), "location", and "lake." Same or similar considerations may apply to the call-by-call object 720 and call-by-call keywords of interest 728 as set forth above with respect to the call-by-call object 710 and the call-by-call keywords of interest 718, and their description is not repeated here.

Process 500 then proceeds to block 516, where the electronic computing device causes an all-call object associated with the plurality of incoming calls including the first and second incoming calls to be displayed in an all-call portion of the interactive dashboard of incoming calls at the display screen communicatively coupled to the electronic computing device.

Returning to the example set forth in FIG. 7, an all-call portion 754 of the screen is generated to display all-call keywords extracted from all individual active incoming calls represented by all of the call-by-call objects appearing in the call-by-call portion 704 of the monitoring dashboard. As shown in FIG. 7, the all-call-portion 754 may be divided into three separate sections (a high priority section 760, a medium priority section 762, and a low priority section 764) based on supported available all-call keyword priorities (which may or may not be equivalent to call-by-call keyword priority), while in other embodiments, no separators may be provided (though the all-call keywords may still be grouped or ordered by priority), while in still other embodiments, no grouping or ordering may be provided for the all-call portion 754.

In some embodiments, all-call keyword selection boxes 766 may be provided for each division of all-call keyword priority so that a user/supervisor may filter call-by-call objects in the call-by-call portion 704 to only those call-by-call objects including a keyword matching a priority of the selected one or more all-call keyword selection boxes 766. For example, if the call-by-call object 720 did not include the keyword "license plate," and (only) the uppermost all-call keyword selection box 766 associated with a highest priority were selected by a user/supervisor, the call-by-call object 720 may be removed from the call-by-call portion 704 of the monitoring dashboard 702. In some embodiments, those call-by-call keywords of interest 718 appearing in call-by-call object 710 may be further filtered as well to only display those call-by-call keywords matching the priority of the selected all-call keyword selection box 766 (e.g., removing "stolen vehicle," "baby", "address", "location", "tattoo", and "lake" from the call-by-call keywords of interest 718), while in other embodiments, the remaining call-by-call keywords of interest remain despite the activation of the selected all-call keyword selection box 766, as long as at least one call-by-call keyword of interest matches the priority of the selected all-call keyword selection box 766.

Returning to FIG. 6, process 500 then proceeds to block 518, where the electronic computing device cross-references the first and second text transcripts with the stored all-call keyword database to identify all-call keywords of interest, and populates the all-call object with the all-call keywords of interest. While in the example of FIGS. 6 and 7, only two active calls are described, the same or similar process could be implemented for any number of active incoming calls, including 1-10, or less than 20, or less than 50, or less than 100.

Returning once more to the example set forth in FIG. 7, it is noted that in the example set forth in FIG. 7, the all-call keyword database is the same database as (or a separate but equivalent database to) the call-by-call keyword database for ease of description. However, in other embodiments, the all-call keyword database may contain additional or fewer keywords than the call-by-call keyword database, individual priorities assigned to keywords appearing in the all-call keyword database may be different than individual priorities assigned to keywords appearing in the call-by-call keyword database, and thresholds for increasing priorities of keywords in the all-call keyword database may be different than thresholds (if any) for increasing priorities of keywords in the call-by-call keyword database, among other possible differences.

As shown in FIG. 7, the all-call portion 754 of the monitoring dashboard 702 is populated by all-call keywords of interest including "description of the suspect" 761 (appearing once across all active incoming call transcripts associated with all incoming calls represented by call-by-call objects in the call-by-call portion of the monitoring dashboard 702), "license plate" (appearing three times across all active incoming call transcripts), "baby" (appearing seven times across all active incoming call transcripts), "stolen vehicle" (appearing twice across all active incoming call transcripts)," "address" (appearing seven times across all active incoming call transcripts), "lakes" (appearing twice across all active incoming call transcripts), "location" (appearing three times across all active incoming call transcripts), and "tattoo". While in this example, a total number of times each all-call keyword appears across all active incoming calls is indicated accompanying each all-call keyword in the all-call portion 754 of the monitoring dashboard 702, in other embodiments, the total number of times may not be displayed, and in still other embodiments, increases in priority of an all-call keyword based on the number of times the keyword appears across all active incoming calls (and which may elevate the importance of a particular keyword in accordance with the description above) may be used instead of or in addition to the number of times indicator to reflect the relative occurrence of a keyword across all active incoming calls. Other methods of indicating importance or priority are possible as well.

As shown in FIG. 7, relative priorities of the all-call keywords are made to vary in a same or similar way as the call-by-call keywords. While in this example, the priorities of all-call keywords are indicated in a same manner as the call-by-call keywords (e.g., thickness of a border surrounding the keywords), in other embodiments, a different visual way of electronically differentiating relative priorities may be used, including a different one of varying one or more of a color, thickness, shading, shape, and size of each of the all-call keywords of interest, a border surrounding each of the all-call keywords of interest, or a background of each of the all-call keywords of interest.

The call type selection filter 740 already described above with respect to the call-by-call portion 704 may have a same or similar effect on the all-call portion 754 as described above with respect to the call-by-call portion, and allow a user/supervisor to cause only all-call keywords of interest to appear in the all-call portion 754 of the monitoring dashboard 702 for only those calls associated with the selected type of call. For example, selecting "emergency only" from the call type selection filter 740 may cause only keywords associated with emergency calls (e.g., for all active incoming calls) to appear in the all-call portion 754. For the example of FIG. 7, this would cause only those keywords appearing in the second call-by-call object 720 to be displayed in the all-call portion 754, as that is the only pending active incoming emergency call. On the other hand, selecting "non-emergency only" from the call type selection filter 740 may cause only all-call keywords appearing in the first call-by-call object 710 to be displayed in the all-call portion 754. In the event different all-call keyword and call-by-call keyword databases are used, the result would clearly vary compared to that shown in FIG. 7 (e.g., be based on matching the underlying call transcripts and not what specifically appears in the call-by-call objects), but would be consistent with the operations set forth herein.

The caller/call-taker selection filter 770 already described above with respect to the call-by-call portion 704 may have a same or similar effect on the all-call portion 754 as described above with respect to the call-by-call portion, and may allow a user/supervisor to cause only all-call keywords of interest to appear in the all-call portion 754 of the monitoring dashboard 702 for only those calls where the all-call keyword was voiced by the selector call participant (e.g., the caller or the call-taker). For example, selecting "caller only" from the caller/call-taker selection filter 770 may cause only keywords that were tagged in the respective call transcripts as being voiced by a caller (e.g., for all active incoming calls) to appear in the all-call portion 754.

Using the example set forth above, if the keywords "location" and "lake" were indicated in the first and the second incoming call text transcripts as being voiced by the call-taker and not by the caller, those keywords would disappear from the all-call portion 754 of the monitoring dashboard 702. However, if the keyword "location" were voiced by the caller in either one of the first and second incoming call text transcripts, it would continue to be displayed in the all-call portion 754 of the monitoring dashboard 702.

Similar effects would be applied when "call-taker only" were selected, but would limit display to those keywords voiced by the call-taker in the respective generated text transcripts for all incoming active calls (and if no keywords were voiced by the call-taker, the all-call portion 754 could be displayed as an empty list).

In some embodiments, the keyword display enable/disable selection filter 742 already described above with respect to the call-by-call portion 704 may have no effect on the all-call portion 754 of the monitoring dashboard 702 (e.g., it would only cause call-by-call keywords to appear and disappear from call-by-call objects, allowing the user/supervisor to continue to have an overall view of the types of incidents/calls without cluttering call-by-call objects with keywords and still allowing a filter of call-by-call objects by selecting an all-call keyword as will be discussed in more detail below). In other embodiments, the keyword display enable/disable selection filter 742 may have an effect on the all-call portion 754 of the monitoring dashboard 702 as well, and may simply cause all-call keywords to disappear from the monitoring dashboard 702, and/or may cause the entire all-call portion 754 to disappear, providing additional room for call-by-call objects to be displayed across the entire monitoring dashboard 702, among other possibilities.

Figure 8:
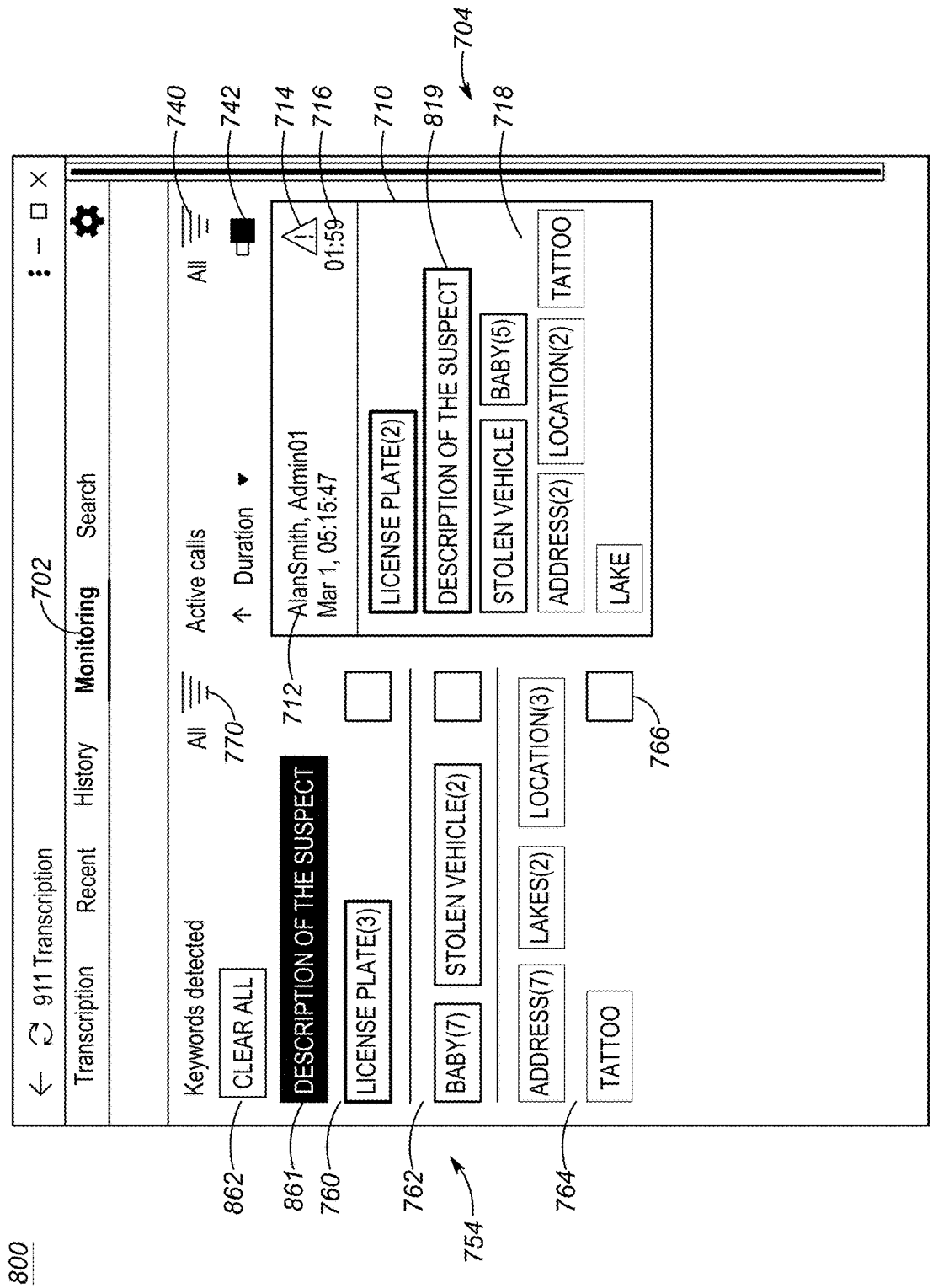
FIG. 8 is a further graphical user interface of the example call transcription supervisory dashboard available at one of the monitoring computer of FIG. 4 and the workstation of FIG. 3, according to one example embodiment.

FIG. 8 illustrates a further interaction 800 between all-call keywords of interest appearing in the all-call portion 754 and call-by-call objects appearing in the call-by-call portion 704 of the monitoring dashboard 702. As illustrated, each of the all-call keywords of interest in the all-call portion 754 are selectable/actionable in response to input from a user to further filter the displayed call-by-call objects and/or call-by-call keywords of interest.

As an example, and as shown in FIG. 8, the all-call keyword of interest "description of the suspect" 861 may be individually selected or activated by a user/supervisor via an input mechanism, and as a result, the displayed call-by-call objects appearing in the call-by-call portion 704 filtered to display only those call-by-call objects that include the all-call keyword selected. In this example, only the call-by-call object 710 included the selected keyword "description of the suspect" in the first incoming call transcript so only that call-by-call object 710 appears and the call-by-call object 720 that did not include that keyword (at least not yet) in the second incoming call transcript is removed from the monitoring dashboard 702. The second incoming call transcript is continued to be monitored, however, and if the selected all-call keyword is subsequently voiced by a caller and/or call-taker in the second incoming call, the second call-by-call object 720 could be caused to reappear in the call-by-call portion 704. In some embodiments, those call-by-call keywords of interest 718 appearing in call-by-call object 710 may be further filtered as well to only display the selected all-call keyword (e.g., "description of the suspect", removing "license plate", "stolen vehicle," "baby", "address", "location", "tattoo", and "lake" from the call-by-call keywords of interest 718), while in other embodiments, the remaining call-by-call keywords of interest remain despite the activation of the selected all-call keyword "description of the suspect" 861, as long as at least one selected all-call keyword matches at least one call-by-call keyword of interest.

In addition, once one or more all-call keywords of interest are selected for the purposes of filtering call-by-call objects that include at least one of the selected all-call keywords of interest, a "clear all" button 862 in the monitoring dashboard 702, within or adjacent the all-call portion 754, is caused to appear that allows the user/supervisor to clear (or deselect) the one or more selected all-call keywords, and revert to the state where no further filtering of call-by-call objects is performed based on selected all-call keywords of interest.

Figure 9:
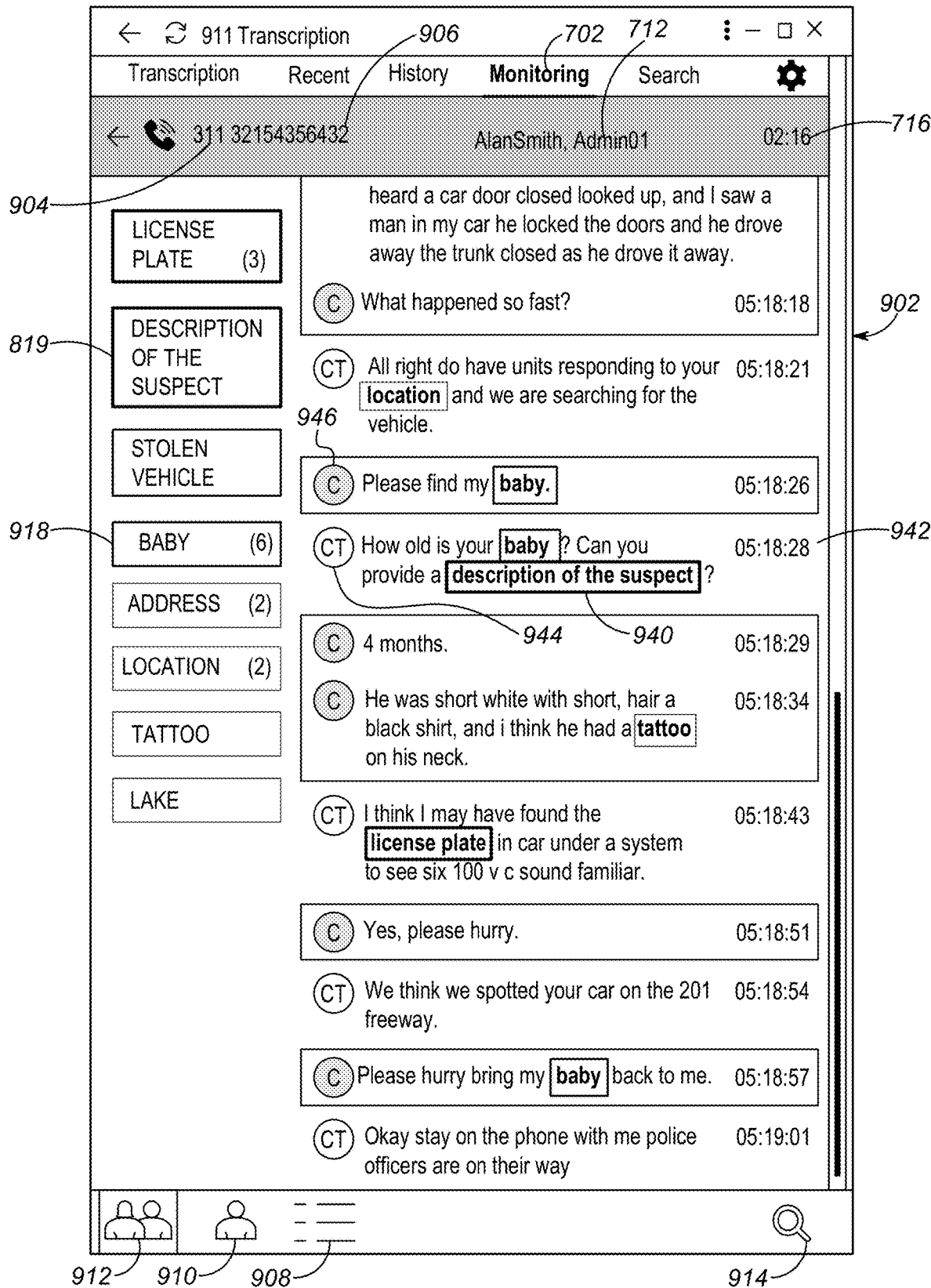
FIG. 9 is a graphical user interface of an example full call transcription view accessible via the call transcription supervisory dashboard available at one of the monitoring computer of FIG. 4 and the workstation of FIG. 3, according to one example embodiment.

As illustrated in FIG. 9, the call-by-call objects 710, 720 of FIG. 7 may further be interacted with to load the full incoming call transcript (as it exists, and as it is added to as the call progresses) via an incoming call full-text transcript display 900. More specifically, and as a result of a user/supervisor selecting (clicking on, double clicking, etc.) one of the call-by-call objects appearing in the call-by-call portion 704 of the monitoring dashboard 702, the monitoring dashboard 702 may be replaced with the respective full incoming call transcript display 900 of FIG. 9.

The full-text transcript display 900 includes several objects and entities from prior display descriptions with similar reference numbers, and their description is not repeated here. A primary full-text transcript window 942 includes a real-time display of the stored full-text transcript of the incoming call associated with the corresponding call-by-call object. In the example of FIG. 9, the full-text transcript display 900 is that created for the first incoming call, and includes a non-emergency number identifier 904 indicating the non-emergency number that the call for the first incoming call dialed (311 in this instance), and an indication of a source telephone number 906 associated with the call identifier 712 that appeared in the first call-by-call object. The call duration timer 716 may also provided in this new view. In addition, a keywords only filter 908 can filter the full-text transcript to show only those communications that include one of the call-by-call keywords of interest, a caller/call-taker filter 910 can filter to show only those communications voiced by the caller or the call-taker respectively, and an all-participants button 912 can return the full-text transcript to showing all participants in the call. Finally, a search button 914 allows a user/supervisor to search the full-text transcript for any word or term, independent of the keywords shown. Searched words or terms may be shown in the full-text transcript in a different manner than that used to highlight call-by-call keywords of interest so as to differentiate the matches in the full-text transcript, perhaps using any of the other methods set forth herein for differentiating keywords of interest.

Within the full-text transcript window 942, the full-text transcript of the first incoming call is displayed, separated by party to the call (e.g., by call taker 944 ("CT") and caller 946 ("C")). Each of the call-by-call keywords of interest are similarly varied to differentiate from other terms in the full-text. For example, and as shown in FIG. 9, the term "description of the suspect" 940 is varied from the text around it in a same manner as that set forth in the call-by-call objects in previous descriptions.

In a similar manner to that already described above, the call-by-call keyword of interest "description of the suspect" 819 on the left hand side of the screen may be selected by the user/supervisor, which would could cause the full-text transcript window 942 to either highlight the occurrences of the term in the full-text (such as further modify the appearance of the "description of the suspect" 940 term in the full-text) or could cause the communications to be filtered to only show those incoming call phrases that include the selected term "description of the suspect."

As additional communications are voiced in the incoming call, the text transcriptions of those communications are added to the full-text transcript window, along with a designation of the incoming call party participant that voiced the communication and any identified call-by-call keywords of interest.

Blocks 504, 506, 512, 514, and 518 may be repeated, in any sequential or parallel order, until the first and second calls (and any other active incoming calls being handled in a same or similar manner) are ended, at which time process 500 ends. In some embodiments, even after one of the incoming calls end, a predetermined delay may be implemented so that even after a call-by-call object associated with an ended call is removed from the monitoring dashboard, all-call keywords of interest associated with that ended call remain in the all-call portion 754 of the monitoring dashboard and, only after the predetermined delay, are they removed. A predetermined delay of, for example, 10, 30, 60, 90, 120, or 360 seconds could be implemented. This allows a user/supervisor to maintain a better view of the content and issues across incoming calls, and prevents call turnover or short calls from negatively affecting the usefulness of the all-call portion and the appearance of trends across all incoming calls.

In the event an all-call keyword of interest associated with an ended call is selected or activated, the removed call-by-call object may be returned to the screen so that the user/supervisor can again select the object and view the full transcript. The ended call-by-call objects may be visually distinguished from the active call-by-call objects in the call-by-call portion 704 of the monitoring dashboard, in any of the ways set forth herein in addition to some visual icon added to the call-by-call object to indicate the ended status of the call associated with the object.

3. Conclusion

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot generate an interactive call transcription supervisory monitoring dashboard for a command center call management system, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A call management system including a call transcription supervisory monitoring interactive dashboard of incoming calls at a command center, the system comprising:
   an electronic computing device including an electronic processor configured to:
      receive a plurality of incoming calls including at least a first incoming call having first audio from a first remote device reflecting a first incident and a second incoming call having second audio from a second remote device reflecting a second incident;
      transcribe the first audio from the first incoming call to create a first text transcript associated with the first incoming call;
      transcribe the second audio from the second incoming call to create a second text transcript associated with the second incoming call;
      cause a first incoming call object associated with the first incoming call to be displayed in a call-by-call portion of an interactive dashboard of incoming calls at a display screen communicatively coupled to the electronic computing device, the first incoming call object including at least a first unique identifier uniquely identifying the first incoming call;
      cause a second incoming call object associated with the second incoming call to be displayed adjacent the first incoming call object in the call-by-call portion of the interactive dashboard of incoming calls at the display screen communicatively coupled to the electronic computing device, the second incoming call object including at least a second unique identifier uniquely identifying the second incoming call;
      cross-reference the first text transcript with a stored call-by-call keyword database to identify first call-by-call keywords of interest, and populating the first incoming call object with the first call-by-call keywords of interest;
      cross-reference the second text transcript with the stored call-by-call keyword database to identify second call-by-call keywords of interest, and populating the second incoming call object with the second call-by-call keywords of interest;
      cause an all-call object associated with all of the plurality of incoming calls including the first and second incoming calls to be displayed in an all-call portion of the interactive dashboard of incoming calls, separate from the call-by-call portion of the interactive dashboard of incoming calls, at the display screen communicatively coupled to the electronic computing device; and
      cross-reference text transcripts of the plurality of incoming calls, including the first and second text transcripts, with a stored all-call keyword database to identify all-call keywords of interest, and populating the all-call object with the all-call keywords of interest in a manner such that the all-call keywords are not differentiated on a call-by-call basis.

2. The system of claim 1, wherein the call-by-call keyword database and the all-call keyword database are different.

3. The system of claim 1, wherein:
   each of the keywords in the call-by-call keyword database and in the all-call keyword database include an associated relative keyword priority selected from a plurality of available different relative keyword priorities; and
   at least one of the all-call keywords of interest in the all-call keyword database includes different priorities dependent upon a number of calls in which the keyword is found.

4. The system of claim 1, wherein each of the keywords in the call-by-call keyword database and in the all-call keyword database include an associated relative keyword priority selected from a plurality of available different relative keyword priorities; and
   the electronic processor further configured to: vary one of a color, thickness, shading, shape, and size of each of the all-call keywords of interest, a border surrounding each of the all-call keywords of interest, or a background of each of the all-call keywords of interest, relative to the associated relative priority of the keywords stored in the all-call keyword database, when populating the all-call object with the all-call keywords of interest.

5. The system of claim 4, the electronic processor further configured to:

vary one of a color, thickness, shading, shape, and size of each of the call-by-call objects, a border surrounding each of the call-by-call objects, or a background of each of the call-by-call objects to match: the color, thickness, shading, shape, and size of a highest priority one of the call-by-call keywords included in the call-by-call object, the border surrounding a highest priority one of the call-by-call keywords included in the call-by-call object, or the background of a highest priority one of the call-by-call keywords included in the call-by-call object.

6. The system of claim 1, wherein each of the keywords in the call-by-call keyword database and in the all-call keyword database include an associated relative keyword priority selected from a plurality of available different relative keyword priorities; and the electronic processor further configured to:

responsive to a detected user-selection of a priority filter object associated with a selected particular one of the plurality of available different relative priorities, sub-selecting the all-call keywords of interest to only display, or display more prominently, those all-call keywords having the selected particular priority; and sub-selecting the call-by-call objects so that only those call-by-call objects that include a call-by-call keyword of interest matching those remaining all-call keywords having the particular selected priority are displayed in the call-by-call portion of the interactive dashboard.

7. The system of claim 6, wherein each call-by-call object continues to display all call-by-call keywords within each relative call-by-call object matching the call-by-call keyword database independent of the user selection of the priority filter object.

8. The system of claim 6, wherein each call-by-call object is further filtered responsive to the detected user-selection of the priority filter object to only show those call-by-call keywords having an assigned priority in the call-by-call keyword database matching the selected particular priority.

9. The system of claim 1, the electronic processor further configured to:

responsive to a detected user-selection of a first one of the all-call keywords of interest in the all-call object, sub-selecting the call-by-call objects so that only those call-by-call objects that include a call-by-call keyword of interest matching the selected first one of the all-call keywords of interest are displayed in the call-by-call portion of the interactive dashboard.

10. The system of claim 1, the electronic processor further configured to:

detect user-activation of a caller/call-taker selection filter to select the call-taker, and responsively, sub-select the call-by-call objects so that only those call-by-call objects that include call-by-call keywords matching the call-by-call keyword database and are indicated as voiced by the call taker in the respective text transcripts are displayed in the call-by-call portion of the screen.

11. The system of claim 1, the electronic processor further configured to:

detect user-activation of a keyword enable/disable selection filter to disable call-by-call keyword display, and responsively, remove each call-by-call keyword from each of the call-by-call objects; and continue to display the all-call keywords of interest and continue to allow filtering of the call-by-call objects responsive to selection of a particular one of the all-call keywords of interest displayed in the all-call object.

12. The system of claim 1, the electronic processor further configured to:

detect an end of one of a particular one of the plurality of incoming calls, and responsively remove a particular call-by-call object associated with the particular one of the plurality of incoming calls from the call-by-call portion of the interactive dashboard; and a predetermined period of time after removing the particular call-by-call object from the call-by-call portion of the interactive dashboard, remove any all-call keywords of interest included in the all-call object that were associated with the particular one of the plurality of incoming calls.

13. The system of claim 12, the electronic processor further configured to:

during the predetermined period of time, responsive to detecting selection of an all-call keyword of interest that matches a call-by-call keyword of interest included in the removed particular call-by-call object, restore the removed particular call-by-call object to the call-by-call portion of the interactive dashboard but with a visual indicator that the removed particular call-by-call object is associated with an ended call.

14. The system of claim 1, the electronic processor further configured to:

responsive to detecting a user-selection of the first incoming call object: remove the all-call object from the display screen, newly display at least a portion of the first text transcript in a first full-text transcript object at the display screen, and include the first call-by-call keywords of interest in a quick-reference keyword object adjacent the first full-text transcript object.

15. The system of claim 14, the electronic processor further configured to:

for each the first call-by-call keyword of interest in the quick-reference keyword object, including a number of times that the first call-by-call keyword of interest appears in the first text transcript; and vary one of a color, thickness, shading, shape, and size of each of the first call-by-call keywords of interest in the first text transcript to match the color, thickness, shading, shape, and size of the first call-by-call keyword of interest in the quick-reference keyword object, a border surrounding each of the first call-by-call keywords of interest in the first text transcript to match the border surrounding the first call-by-call keyword of interest in the quick-reference keyword object, or a background of each of the first call-by-call keywords of interest in the first text transcript to match the background surrounding the first call-by-call keyword of interest in the quick-reference keyword object.

16. A method for a call management system providing a call transcription supervisory monitoring interactive dashboard of incoming calls at a command center, the method comprising:

receiving, at an electronic computing device, a plurality of incoming calls including at least a first incoming call having first audio from a first remote device reflecting a first incident and a second incoming call having second audio from a second remote device reflecting a second incident;

transcribing, by the electronic computing device, the first audio from the first incoming call to create a first text transcript associated with the first incoming call;

transcribing, by the electronic computing device, the second audio from the second incoming call to create a second text transcript associated with the second incoming call;

causing, by the electronic computing device, a first incoming call object associated with the first incoming call to be displayed in a call-by-call portion of an interactive dashboard of incoming calls at a display screen communicatively coupled to the electronic computing device, the first incoming call object including at least a first unique identifier uniquely identifying the first incoming call;

causing, by the electronic computing device, a second incoming call object associated with the second incoming call to be displayed adjacent the first incoming call object in the call-by-call portion of the interactive dashboard of incoming calls at the display screen communicatively coupled to the electronic computing device, the second incoming call object including at least a second unique identifier uniquely identifying the second incoming call;

cross-referencing, by the electronic computing device, the first text transcript with a stored call-by-call keyword database to identify first call-by-call keywords of interest, and populating the first incoming call object with the first call-by-call keywords of interest;

cross-referencing, by the electronic computing device, the second text transcript with the stored call-by-call keyword database to identify second call-by-call keywords of interest, and populating the second incoming call object with the second call-by-call keywords of interest;

causing, by the electronic computing device, an all-call object associated with all of the plurality of incoming calls including the first and second incoming calls to be displayed in an all-call portion of the interactive dashboard of incoming calls, separate from the call-by-call portion of the interactive dashboard of incoming calls, at the display screen communicatively coupled to the electronic computing device; and cross-referencing, by the electronic computing device, text transcripts of the plurality of incoming calls, including the first and second text transcripts with a stored all-call keyword database to identify all-call keywords of interest, and populating the all-call object with the all-call keywords of interest in a manner such that the all-call keywords are not differentiated on a call-by-call basis.

17. The method of claim 16, the method further comprising:

calculating a first number of times each of the identified first call-by-call keywords of interest appear in the first text transcript, and displaying indicators of the calculated first number of times each of the identified first call-by-call keywords of interest appear in the first text transcript adjacent the respective identified first call-by-call keyword;

calculating a second number of times each of the identified second call-by-call keywords of interest appear in the second text transcript, and displaying indicators of the calculated second number of times each of the identified second call-by-call keywords of interest appear in the second text transcript adjacent the respective identified second call-by-call keyword; and calculating a third number of times each of the identified all-call keywords of interest appear in the first and second text transcripts, and displaying indicators of the calculated third number of times each of the identified all-call keywords of interest appear in the first and second text transcripts adjacent the respective identified all-call keyword.

18. The system of claim 1, the electronic processor further configured to:

calculate a first number of times each of the identified first call-by-call keywords of interest appear in the first text transcript, and display indicators of the calculated first number of times each of the identified first call-by-call keywords of interest appear in the first text transcript adjacent the respective identified first call-by-call keyword;

calculate a second number of times each of the identified second call-by-call keywords of interest appear in the second text transcript, and display indicators of the calculated second number of times each of the identified second call-by-call keywords of interest appear in the second text transcript adjacent the respective identified second call-by-call keyword; and calculate a third number of times each of the identified all-call keywords of interest appear in the first and second text transcripts, and display indicators of the calculated third number of times each of the identified all-call keywords of interest appear in the first and second text transcripts adjacent the respective identified all-call keyword.

19. The method of claim 16, the method further comprising:

calculating a first number of times each of the identified first call-by-call keywords of interest appear in the first text transcript, and displaying an indication of the calculated first number of times in the first incoming call object;

calculating a second number of times each of the identified second call-by-call keywords of interest appear in the second text transcript, and displaying an indication of the calculated second number of times in the second incoming call object; and calculating a third number of times each of the identified all-call keywords of interest appear in the first and second text transcripts, and displaying an indication of the calculated third number of times in the all-call object.

20. The system of claim 1, the electronic processor further configured to:

calculate a first number of times each of the identified first call-by-call keywords of interest appear in the first text transcript, and display an indication of the calculated first number of times in the first incoming call object;

calculate a second number of times each of the identified second call-by-call keywords of interest appear in the second text transcript, and display an indication of the calculated second number of times in the second incoming call object; and calculate a third number of times each of the identified all-call keywords of interest appear in the first and second text transcripts, and display an indication of the calculated third number of times in the all-call object.

\* \* \* \* \*